United States Patent
Mahdavi et al.

(10) Patent No.: US 11,658,952 B1
(45) Date of Patent: *May 23, 2023

(54) METHODS AND SYSTEMS FOR TRANSMITTING ANONYMIZED INFORMATION

(71) Applicant: WhatsApp LLC, Menlo Park, CA (US)

(72) Inventors: Jamshid Mahdavi, San Jose, CA (US); Ehren Andrew Kret, Sunnyvale, CA (US)

(73) Assignee: WhatsApp LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,072

(22) Filed: Jun. 28, 2021

Related U.S. Application Data

(63) Continuation of application No. 16/236,394, filed on Dec. 29, 2018, now Pat. No. 11,265,300, and a
(Continued)

(51) Int. Cl.
 *G06F 21/62* (2013.01)
 *H04L 9/08* (2006.01)
 *H04L 9/40* (2022.01)

(52) U.S. Cl.
 CPC ...... *H04L 63/0471* (2013.01); *G06F 21/6254* (2013.01); *H04L 9/085* (2013.01);
 (Continued)

(58) Field of Classification Search
 CPC ............ H04L 63/0471; H04L 63/0478; H04L 9/0819; H04L 9/085; H04L 2209/42; G06F 21/6254
 See application file for complete search history.

(56) References Cited

U.S. PATENT DOCUMENTS 6,990,528 B1  1/2006 Neal et al.
7,113,995 B1  9/2006 Beukem et al.
(Continued)

OTHER PUBLICATIONS

Per-hop data encryption protocol for transmitting data securely over public networks, Hiroaki Nishi et al. 2014 (Year: 2014).*
(Continued)

*Primary Examiner* — Vu V Tran
(74) *Attorney, Agent, or Firm* — McDermott Will & Emery LLP

(57) ABSTRACT

Exemplary embodiments relate to techniques for anonymizing information in an end-to-end (E2E) encrypted environment; the information may include, for example, statistical data about unique page/message views, view counts, view time, what users selected on the message or page, etc. Exemplary embodiments may prevent an E2E system server from being able to identify which user is associated with which record. Various examples are described, including an embodiment in which an originating client generates the data, encrypts it, and sends it to a random contact. The contact decrypts the data, re-encrypts it, and sends it to another random contact. The procedure continues for a set amount of time or for a set number of hops. Other embodiments relate to wrapping the data in various layers of encryption and sending the data to clients in a chain. The encrypted layers prevent clients along the chain from being able to view the anonymized data.

20 Claims, 16 Drawing Sheets

Related U.S. Application Data continuation of application No. 16/236,411, filed on Dec. 29, 2018, now Pat. No. 11,050,723.

(52) U.S. Cl.
CPC ........ *H04L 9/0819* (2013.01); *H04L 63/0478* (2013.01); *H04L 2209/42* (2013.01)

(56) References Cited

U.S. PATENT DOCUMENTS

| | | | |
|---|---|---|---|
| 8,009,826 | B2 | 8/2011 | Barkan et al. |
| 2004/0098485 | A1* | 5/2004 | Larson .................... H04L 45/24 709/227 |
| 2006/0075246 | A1 | 4/2006 | Suga |
| 2007/0165865 | A1 | 7/2007 | Talvitie |
| 2008/0270416 | A1 | 10/2008 | Flake et al. |
| 2010/0041378 | A1 | 2/2010 | Aceves et al. |
| 2011/0016319 | A1 | 1/2011 | Lundberg et al. |
| 2011/0044233 | A1* | 2/2011 | Cho ....................... H04B 7/155 370/315 |
| 2012/0166582 | A1* | 6/2012 | Binder .................... G06F 21/78 709/217 |
| 2015/0106096 | A1 | 4/2015 | Toopran et al. |
| 2018/0048567 | A1 | 2/2018 | Ignatchenko |
| 2018/0375644 | A1* | 12/2018 | Karagiannis ........ H04L 63/0281 |
| 2020/0177557 | A1* | 6/2020 | Tzur-David ........ H04L 63/0435 |

OTHER PUBLICATIONS

Multi-party encryption (MPE): secure communications in delay tolerant networks, Kumar et al. (Year: 2015).*

* cited by examiner

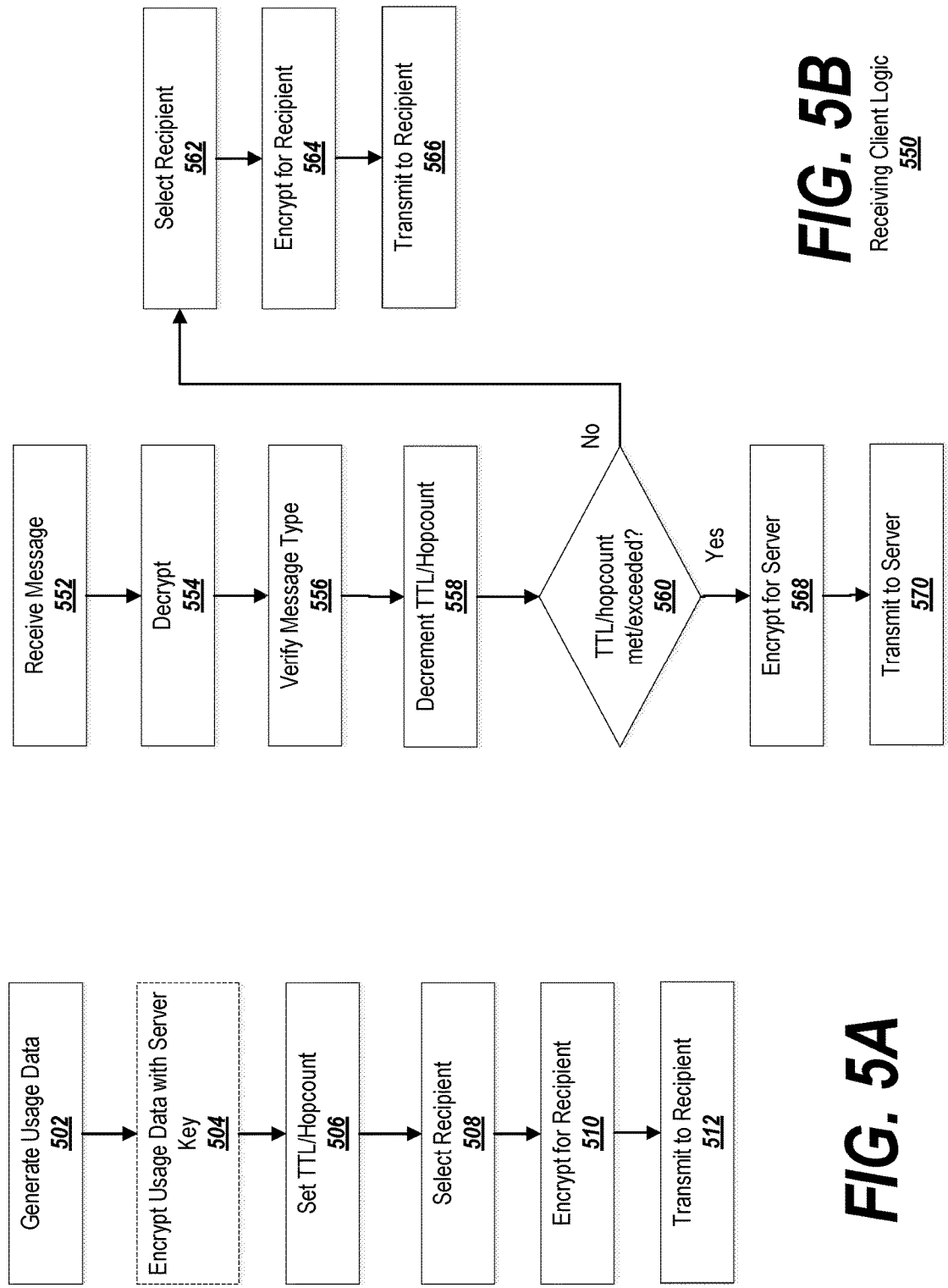

Sending Client Logic
*600*

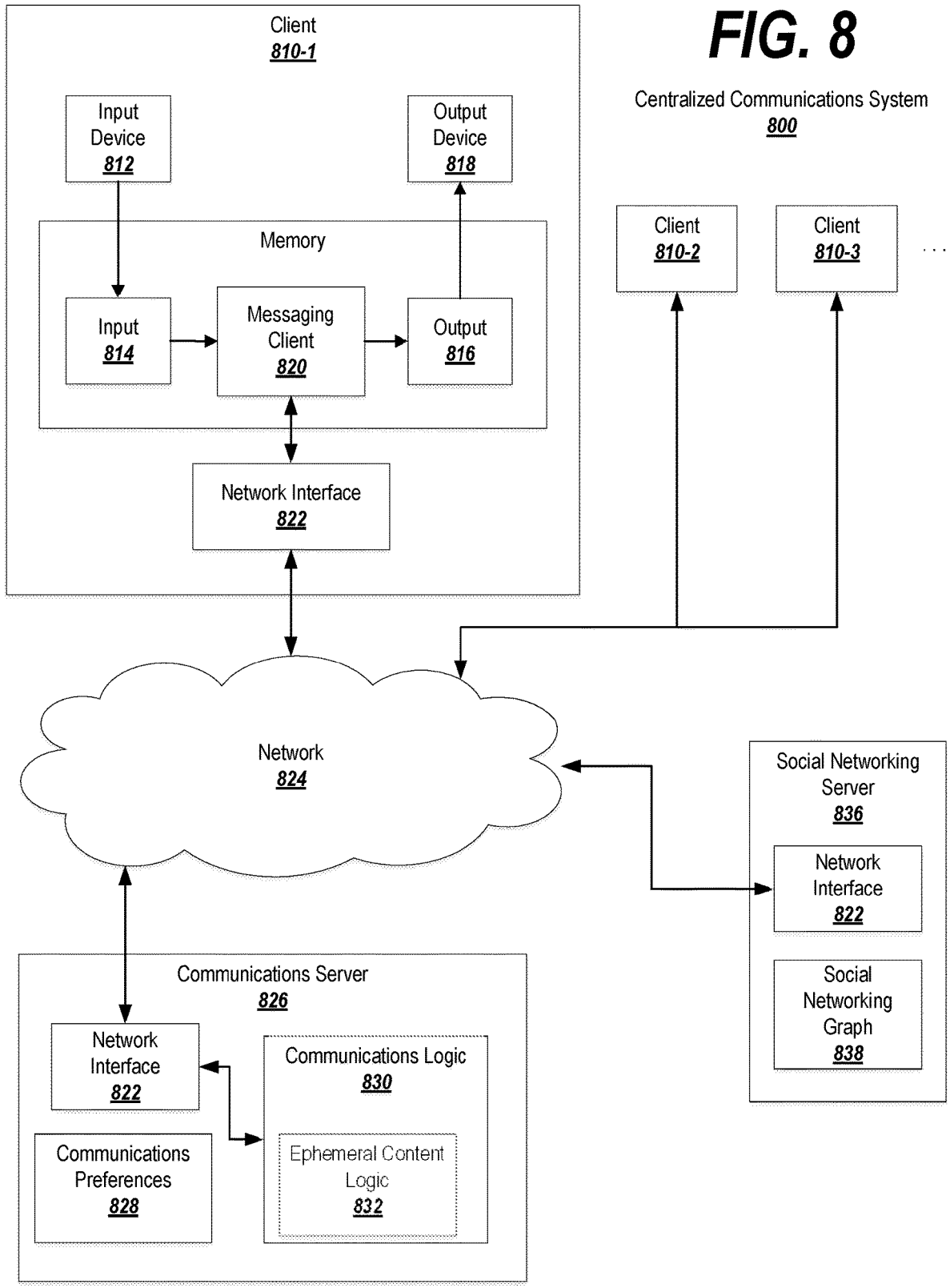

METHODS AND SYSTEMS FOR TRANSMITTING ANONYMIZED INFORMATION

CROSS-REFERENCE TO RELATED APPLICATIONS

This application is a continuation of, and claims the benefit of priority under 35 U.S.C. § 120 to, U.S. patent application Ser. No. 16/236,411 filed Dec. 29, 2018, which is a continuation of, and claims the benefit of priority under 35 U.S.C. § 120 to, U.S. patent application Ser. No. 16/236,394 filed Dec. 29, 2018, which are incorporated herein by reference in their entireties.

BACKGROUND

Some services, such as communications services, messaging services, and social networking services, allow users to exchange messages with other users. In some cases, it may be helpful for system maintenance or other purposes to capture data about how the messaging service is being used (e.g., how many times a business's profile is viewed by others). However, it may be undesirable to collect this data if the data can be connected back to a particular user, as this may negatively impact that user's privacy.

BRIEF DESCRIPTION OF THE DRAWINGS

FIG. 5A is a flowchart depicting exemplary sending-client-side logic for transmitting anonymized information according to the first embodiment.

FIG. 5B is a flowchart depicting exemplary receiving-client-side logic for retransmitting anonymized information according to the first embodiment.

FIG. 8 is a block diagram providing an overview of a system including an exemplary centralized communications service;

DETAILED DESCRIPTION

Figure 1:
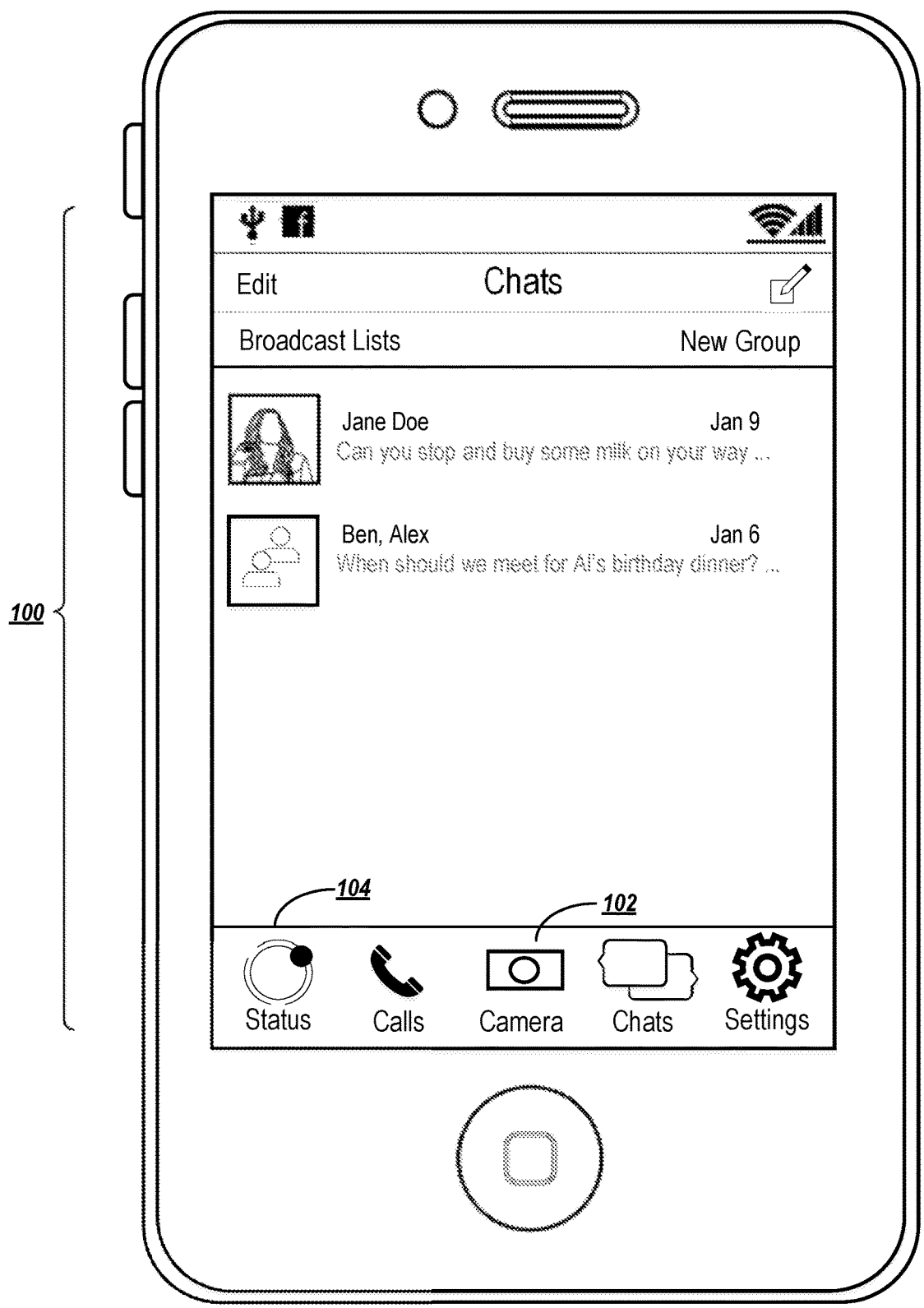
FIG. 1 depicts an exemplary interface for a messaging application.

As noted above, it is important to protect users' privacy when collecting data about a service, but at the same time it may be helpful to generate usage statistics to demonstrate the value of the service, provide insights into the service usage, and/or allow the service to be improved.

One possible solution to this problem is to anonymize the data (e.g., by removing any identifying characteristics from the data) before it is transmitted. For example, when the data is initially sent to a server with a user identifier, it may be sent with a hash of the user identifier so that the data cannot be connected to a specific originating user. This permits the system to (for example) determine a number of unique visitors by counting the number of unique hashes that have been seen.

However, the service collecting the data may still be able to identify which user sent the data (and thereby connect the data with the user in this way). For example, if the service receives anonymized usage data but also sees that the data originated from User X's device, the service may assume that User X is the originator of the data.

Exemplary embodiments relate to techniques for anonymizing user data in a way that a communications system that transmits the user data is not able to determine which user originated the data. The data may include any type of usage information such as a number of visits the user engaged in with a particular site or another user's profile, an amount of time spent viewing the site or profile, a geographic region of the user, what portion of the site or profile the user viewed (and/or how long the user spent there), what elements the user interacted with, etc.

According to one embodiment, the usage data may be encrypted and sent as a message from the originating user to a random contact from the originating user's contacts list. The random contact may decrypt the data, re-encrypt it locally, and send it to another client. The random contact may wait a randomized period of time before re-transmitting the data. This procedure may continue for a predetermined total amount of time (e.g., a time-to-live) or for a set number of hops.

This technique allows the data to be transmitted without the messaging service being aware of which user originated the data. Various improvements or alternatives may also be implemented to further improve the privacy of the data.

For instance, another embodiment may wrap the usage data in various layers of encryption to further protect it from being read by clients en route to the server. In one such embodiment, the originating client may choose n contacts from the originating clients contacts list, and may specify an order that the clients should receive the usage data. The client wraps the usage data in different layers of encryption, one for each client. Each client along the chain decrypts their portion, waits a period of time, and then sends the (still-encrypted) remaining portions to the next specified client. Optionally, the final hop may be encoded with a server key, so that the server acts as the final step in the chain. This allows the usage data to be sent without exposing it to the final client in the chain (the one immediately preceding the server).

In the preceding embodiment, an untrustworthy server may attempt to determine which client originated the usage data by assigning the client a unique server encryption key that can be recognized by the server when the server receives the encrypted data. In order to avoid this problem, the originating client may generate an encryption key that can be used to decrypt the final layer of data, and send this encryption key to the server via a separate path from the usage data. This embodiment has the further advantage of allowing the loss rate of the usage data to be estimated, depending on how many messages are received without encryption keys (or vice versa). Based on the usage data received and the estimated loss rate, more accurate usage statistics may be generated.

In any of the above-described embodiments, the encryption key and usage data may each be divided into n parts and transmitted along different routes (alternatively, the usage data and key may each be split into n parts and corresponding parts may be transmitted together). The usage data and encryption key may be reassembled at the server after all of the messages are received. This helps to keep message sizes constant, so that the server (or other actors) cannot attempt to determine which messages might include usage data as the messages are transmitted through the system. To further address this problem, messages may be padded at random, to make it even more difficult to distinguish usage data from general traffic.

Still further, some embodiments may employ an n+1*message, which represents an error correction portion (e.g., an XOR of the n messages making up the usage data and/or the encryption key). This allows the system to tolerate some loss—as long as n messages are received, the missing data can always be regenerated. Other well-known error correction algorithms which are more sophisticated may similarly be used to make the system tolerant to multiple lost messages.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1 depicts an exemplary interface 100 for a communication application. The communication application may allow the user to exchange communications, such as messages and ephemeral content, with other users of a communications service. The interface may display messages organized into conversations/chats.

A conversation or chat may be associated with a conversation identifier that identifies the conversation or chat. The conversation identifier may further be associated with a group of participants that participate in the conversation.

A user may contribute to a conversation/chat by sending a message using the interface 100. For example, the interface 100 may include a composition indicator for composing a new message. When composing a new message, an interface may be presented allowing the user to target the new message to an existing conversation, and/or to specify a set of recipients. If the specified set of recipients corresponds to a set of recipients for whom a conversation already exists, the message may be targeted to the existing conversation. If not, a new conversation may be created between the specified recipients. The message may be tagged with the conversation ID of the identified conversation.

The interface 100 may display recent conversations and information about the conversation (e.g., participants, a snippet of the most recent message, a time and sender of the most recent message, etc.).

The interface 100 may include a menu or interactable elements allowing functionality of the communication to be accessed. For example, the exemplary interface 100 includes a camera icon 102 allowing a camera interface to be accessed for capturing a photograph or video. The interface 100 further includes an ephemeral content icon 104 allowing ephemeral content to be generated and/or viewed. These elements are exemplary, and in other embodiments other types of elements may be present. For example, in addition to or in place of the camera icon 102, one or more media icons may be provided for generating, accessing, or selecting different types of media.

Figure 2:
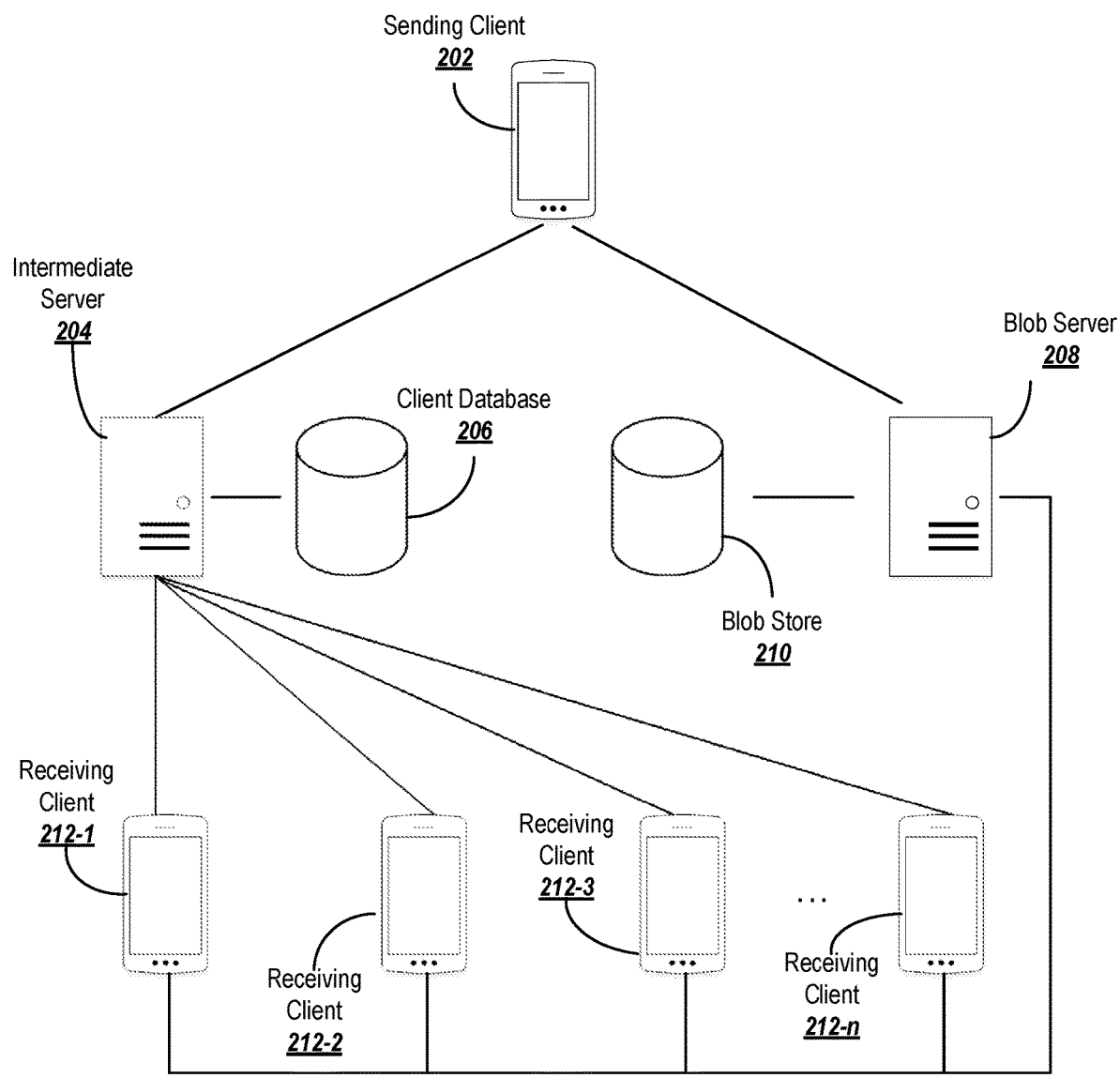
FIG. 2 depicts an exemplary system suitable for applying end-to-end encryption to messages.

An exemplary system for transmitting anonymized data and end-to-end encrypted messages is next described with respect to FIG. 2.

Exemplary End-to-End Encryption System

As shown in FIG. 2, exemplary embodiments may provide end-to-end encryption between a sending client 202 and a receiving client 212-$i$ facilitated by an intermediate server 204. Some embodiments described herein utilize server-side fan out to transmit group messages and broadcasts. In a server-side fan out procedure, the sending client 202 transmits a single copy of the message to the server 204, which then transmits a copy of the message to the appropriate recipient clients 212-$i$, as illustrated in FIG. 2.

All communication between clients 202, 212 and servers 204 may be layered within a separate encrypted channel. End-to-end capable clients may use, for example, Noise Pipes with Curve25519, Advanced Encryption Standard Galois/Counter Mode (AES_GCM), and Secure Hash Algorithm 256 (SHA256) from the Noise Protocol Framework for long running interactive connections. The parameters for setting up the encrypted channel may be stored in a client database 206 at the server 204.

Such a configuration provides several desirable properties, including: fast, lightweight connection and resume; encryption of metadata to hide it from unauthorized network observers; information about the connecting user's identity is not revealed; and no client authentication secrets are stored on the server 204. Clients may authenticate themselves using a Curve 25519 key pair, so the server only stores a client's public authentication key. If the server's user database 206 is ever compromised, no private authentication credentials will be revealed.

In order to transmit media and/or attachments in an encrypted manner, the communications system may also include a blob server 208 hosting a blob store 210. Use of the blob store 210 to transmit content (particularly in conjunction with sending an ephemeral content message) is described in more detail below.

Exemplary Encryption Protocol and Data Structures

This section describes an exemplary encryption protocol and data structures suitable for use in end-to-end encryption. Although embodiments are illustratively described herein with regards to specific examples, the present invention is not limited to the examples described. Some aspects described herein may be used with any type of communications system or encryption protocol, while others may be preferably employed in connection with an end-to-end encrypted communications system.

An example of an encryption protocol suitable for use with exemplary embodiments is the Signal Protocol designed by Open Whisper Systems of San Francisco, Calif. Exemplary embodiments may also utilize the anonymous key agreement protocol Elliptic Curve Diffie-Hellman (ECDH). Nonetheless, other encryption protocols and key agreement protocols may also be suitable for use with exemplary embodiments.

Advantageously, end-to-end encrypted protocols may prevent third parties (and even the communications service itself) from having plaintext access to messages transmitted by the service. Even if encryption keys from a user's device are physically compromised, they cannot be used to go back in time to decrypt previously transmitted messages.

Figure 3A:
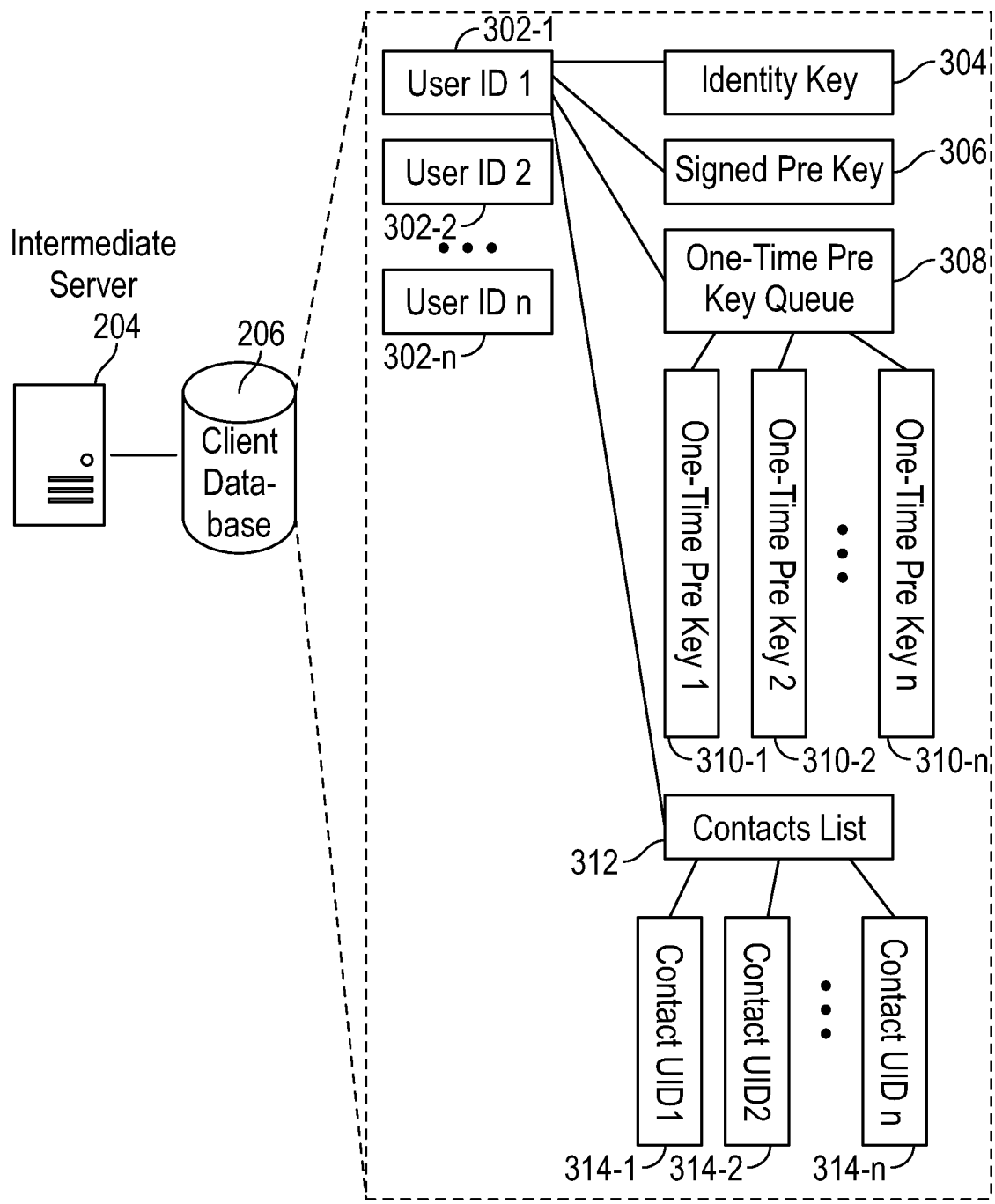
FIG. 3A depicts an exemplary data structure representing a client database.

In order to use end-to-end encryption, a user may initially register with the communications service. The user's registration information may be stored in the client database 206, as shown in FIG. 3A. Each user may be associated with an entry 302-$i$ indexed by an identifier assigned to the user account.

At registration time, an application of the communications service associated with the registering user may transmit a public identity key 304, a public signed pre key 306 with its signature, and a batch of public one-time pre keys 310-$i$ to the intermediate server 204.

In one embodiment, the identity key 304 may be a long-term Curve25519 key pair, generated at the time that the application is installed on the client device. The signed pre-key 306 may be a medium-term Curve25519 key pair, generated at install time and signed by the identity key. The signed pre-key 306 may be rotated on a periodic basis. The one-time pre keys 310-$i$ may be a queue 308 of Curve25519 key pairs for one-time use, generated at install time, and replenished as needed.

The server 204 may store these public keys 304, 306, 310-$i$ associated with the user's identifier 302-$i$. According to exemplary embodiments, at no time does the server 204 have access to any of the client's private keys.

In addition to the public keys 304, 306, 310-$i$, the server 204 may store a contacts list 312 including one or more contact user identifiers 314-$i$ associated with the contacts of the user account. The contacts in the contacts list 312 may be, or may be derived from, a contacts list on the user's mobile device. Some entries in the contacts list 312 may be associated with one or more flags. One example of such a flag is a blocked-user flag, indicating that the user associated with the respective contact user identifier 314-$i$ is blocked by the user account associated with the entry 302-$i$. When a user account is blocked, messages from the blocked user are not delivered to the blocking user.

In some embodiments, the intermediate server 204 may not store the contacts list 312, but may instead be capable of querying potential recipient clients for their own contacts list in order to provide the filtering functionality described below.

Figure 3B:
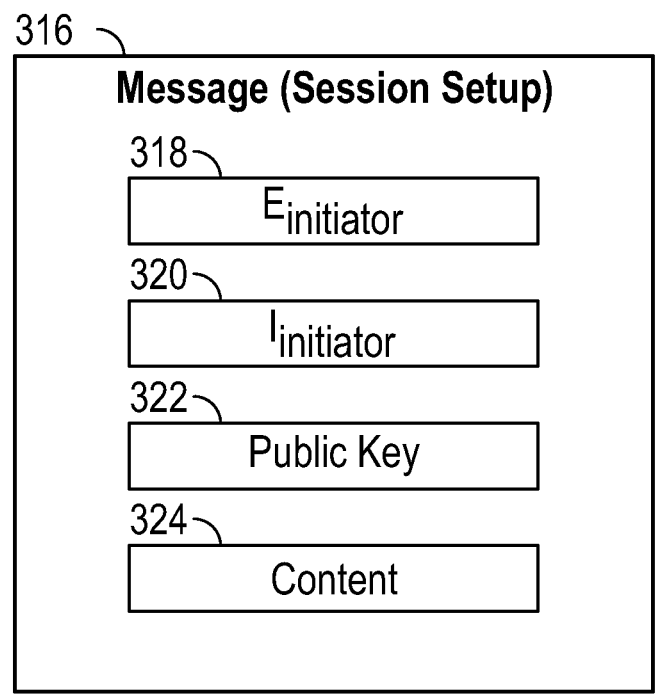
FIG. 3B depicts an exemplary data structure representing a message including session setup information.

The information from the client database 206 may be used to initiate an end-to-end encrypted session; using the session information, end-to-end encrypted messages may be exchanged until the session is ended or expires. Once the session is established, clients do not need to rebuild a new session with each other until the existing session state is lost (e.g., through an external event such as an app reinstall or device change). FIG. 3B depicts an exemplary message 316 suitable for establishing an end-to-end encrypted session.

In order to establish a session, the client initiating the session ("initiator") may request the public identity key 304, public signed pre key 306, and a single public one-time pre key 310-$i$ for the recipient.

In response, the server 204 may return the requested public key values. A one-time pre key 310-$i$ is only used once, so it is removed from the server storage after being requested. The initiator may save the recipient's identity key 304 as $I_{recipient}$, the signed pre key 306 as $S_{recipient}$, and the one-time pre key 310-$i$ as $O_{recipient}$.

The initiator may then generate an ephemeral Curve25519 key pair as $E_{initiator}$ 318. The initiator may load its own identity key 304 as $I_{initiator}$ 320. The initiator may calculate a master secret as:

$$\text{master\_secret} = ECDH(I_{initiator}, S_{recipient}) \|$$
$$ECDH(E_{initiator}, I_{recipient}) \| ECDH(E_{innitiator}, S_{recipient}) \|$$
$$ECDH(E_{initiator}, O_{recipient})$$

Equation 1

If there is no one-time pre key 310-$i$ (e.g., the keys in the queue 308 had been exhausted when the initiator requested such a key and had not been replenished by the recipient), then the final ECDH may be omitted.

The initiator may use a Hashed Message Authentication Code (HMAC)-based key derivation function (HKDF) to create a root key and chain keys from the master secret, as discussed in more detail below. A root key may be a 32-byte value that is used to generate chain keys. A chain key may be a 32-byte value used to create message keys. A message key may be an 80-byte value that is used to encrypt message contents. In the message key, 32 bytes may be used for an Advanced Encryption Standard-256 (AES-256) key, 32 bytes may be used for an HMAC Secure Hash Algorithm-256 (HMAC-SHA256) key, and 16 bytes may be used for an initialization vector (IV).

After building a long-running encryption session, the initiator may immediately start sending messages 316 to the recipient, even if the recipient is offline. Until the recipient responds, the initiator may include the information (in the header of all messages sent) that the recipient requires to build a corresponding session. This includes the initiator's $E_{initiator}$ 318 and $I_{initiator}$ 320. Optionally the message may also include a public key 322 and encrypted content 324, as described in connection with FIG. 3C.

When the recipient receives a message 316 that includes session setup information, the recipient may calculate the corresponding master secret using its own private keys and public keys advertised in the header of the incoming message. The recipient deletes the one-time pre key 310-$i$ used by the initiator. The initiator may use HKDF to derive a corresponding root key and chain keys from the master secret.

Once a session is established, clients may exchange messages that are protected with a message key using AES256 in cipher block chaining (CBC) mode for encryption, and HMAC-SHA256 for authentication.

The message key may change for each message transmitted, and is ephemeral such that the message key used to encrypt a message cannot be reconstructed from the session state after a message has been transmitted or received.

The message key may be derived from a sender's chain key that ratchets forward with every message sent. Additionally, a new ECDH agreement is performed with each message roundtrip to create a new chain key. This provides forward secrecy through the combination of both an immediate hash ratchet and a round trip Diffie-Hellman (DH) ratchet.

Each time a new message key is needed by a sender, the message key may be calculated as:

$$\text{Message Key} = \text{HMAC-SHA256(Chain Key,0x01)} \quad \text{Equation 2:}$$

The chain key may then be updated as:

$$\text{Chain Key} = \text{HMAC-SHA256(Chain Key,0x02)} \quad \text{Equation 3:}$$

This causes the chain key to ratchet forward, and also means that a stored message key can't be used to derive current or past values of the chain key.

Figure 3C:
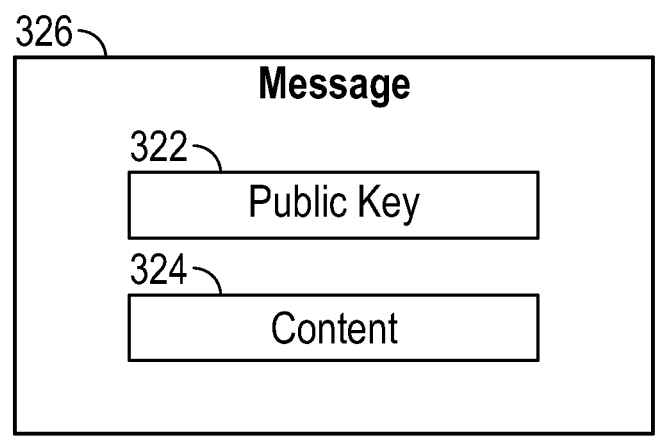
FIG. 3C depicts an exemplary data structure representing a message after session setup has occurred.

As shown in FIG. 3C, each time a message 326 is transmitted, a public key 322 (e.g., an ephemeral Curve25519 public key) may be advertised along with the encrypted message content 324. Once a response is received, a new chain key and root key may be calculated as:

$$\text{ephemeral\_secret} = ECDH(\text{Ephemeral}_{sender}, \text{Ephemeral}_{recipient}) \quad \text{Equation 4:}$$

$$\text{Chain Key,Root Key} = \text{HKDF(Root Key,ephemeral\_secret)} \quad \text{Equation 5:}$$

According to exemplary embodiments, a chain is only ever used to send messages from one user, so message keys are not reused. Because of the way message keys and chain keys are calculated, messages can arrive delayed, out of order, or can be lost entirely without causing problems.

Figure 3D:
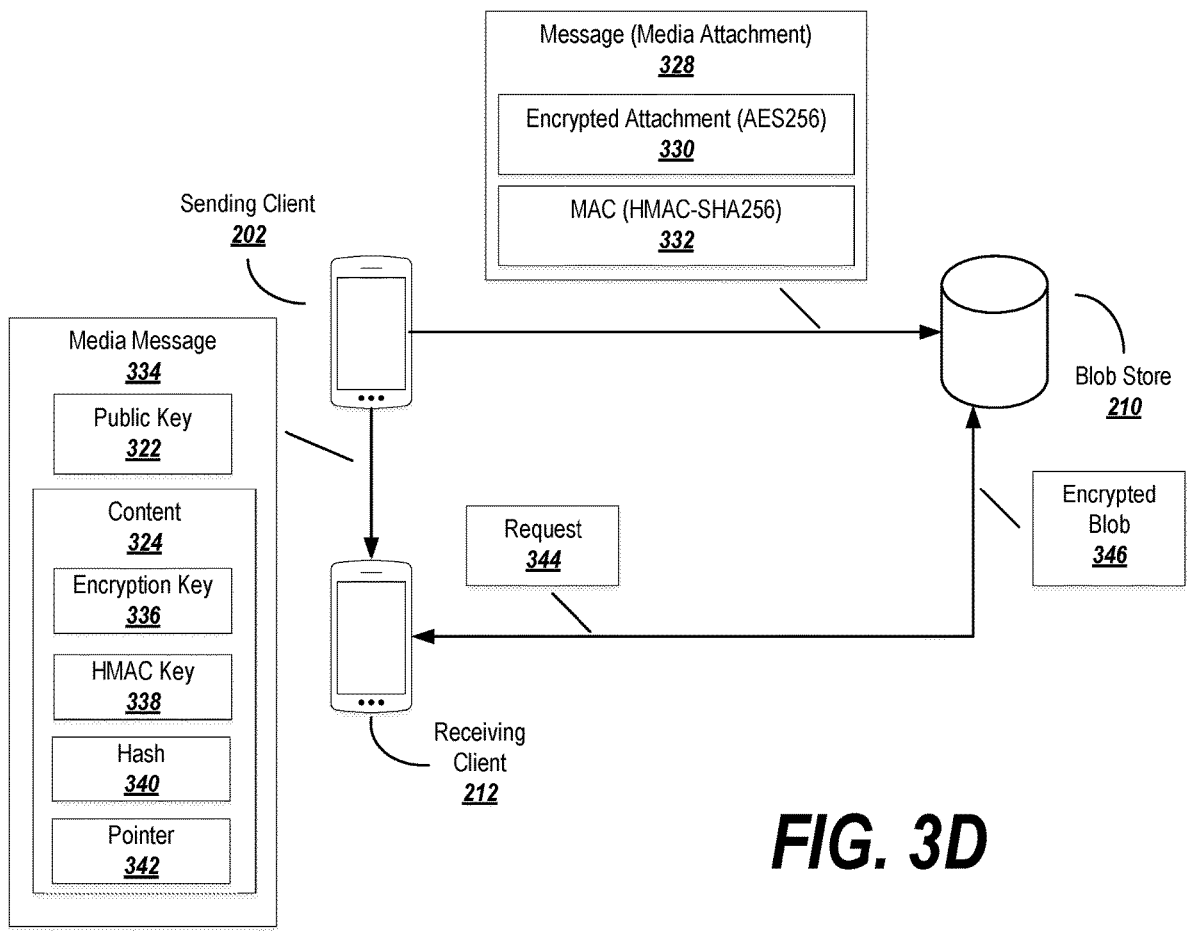
FIG. 3D depicts exemplary messages transmitted in a network in order to exchange media files in an end-to-end encrypted communications system.

End-to-end encryption may also be used to transmit media and other attachments, as shown in FIG. 3D. The sending client 202 sending the message 328 may generate an ephemeral 32 byte AES256 key 336, and an ephemeral 32 byte HMAC-SHA256 key 338. The sender may encrypt the attachment 330 with the AES256 key in CBC mode with a random IV, then append a message authentication code (MAC) 332 of the ciphertext using HMAC-SHA256. The sending client 202 may then upload the encrypted attachment 330 as a blob to the blob store 210.

The sending client 202 may then transmit a normal encrypted message 334 to a receiving client 212. The message 334 may be secured using a public key 322, as discussed above. The content 324 of the message 334 may include the encryption key 336, the HMAC key 338, a SHA256 hash of the encrypted blob 340, and a pointer 342 to the blob in the blob store.

The receiving client 212 may decrypt the content 324 and transmit a request 344 for the blob stored at the location of the pointer 342. After receiving the encrypted blob 346, the receiving client may calculate a SHA256 hash of the blob and verify that the hash matches the hash 340 of the message 334, may verify the MAC 332, and may decrypt the plaintext.

Messages may be fanned out from the server 204 for broadcast or group messages. In other words, a client wishing to send a message to a group of users may transmit a single message to the server 204, which is then distributed n times to the n different group members (or n different broadcast recipients) by the server 204.

Some embodiments may alternatively be used in connection with a client-side fan out procedure, where a client transmits a single message n different times to the n different group members or broadcast recipients. One reason to favor server-side fan out in comparison to client side fan out is efficiency: in a server side fan out procedure, the client need only transmit a single message to the server, as opposed to the n messages that must be transmitted in a client fan out procedure. Moreover, server-side fan out allows the server 204 to implement procedures for improving network efficiency and reducing messaging spam, such as the filtering procedures described herein. The procedures described above for developing pairwise encrypted sessions achieve efficient server-side fan out for most messages sent to groups or broadcast recipients.

Efficient group messaging may be accomplished using the sender keys component of the Signal Messaging Protocol. More specifically, the first time a group member sends a message to a group, the sender may generate a random 32-byte chain key and a random Curve25519 signature key key pair. The sender may combine the 32-byte chain key and the public key from the signature key into a sender key message. The sender may individually encrypt the sender key to each member of the group, using the pairwise messaging protocol explained above.

For all subsequent messages to the group, the sender may derive a message key from the chain key, and update the chain key. The sender may encrypt the message using AES256 in CBC mode, and may sign the ciphertext using the signature key. The sender may transmit the single ciphertext message to the server, which performs server-side fan out to all group recipients. The hash ratchet of the message sender's chain key provides forward secrecy. Whenever a group member leaves, all group participants clear their sender key and start over.

Exemplary Systems and Techniques for Anonymizing Data

Two exemplary techniques for anonymizing data, along with suggested variations, are next described.

The first technique relates to an embodiment in which usage data is forwarded through a network for a specified amount of time or for a specified number of hops. The originating user may specify all of the recipients in a chain (thereby determining the number of hops), or may specify that each receiving client should continue forwarding the message until a specified amount of time or a specified number of hops has been met. After the specified number of hops is met of the time-to-live is met or exceeded, the receiving client may forward the usage data to the server aggregating the usage data. The latter variation potentially allows the message to reach farther out into the network, thereby further obfuscating the identity of the original sender.

The second technique relates to an embodiment in which the originating client selects the number and order of recipients along the chain. The originating client encrypts the usage data in a message designated for a final client, then wraps this message in a further layer of encryption designated for a second-to-last recipient to generate a further message, and repeats the process until each of the clients along the chain has been accounted for. The originating client sends the message to a first client, which unwraps its own layer of encryption to reveal a new message encrypted for a second client. The first client forwards the message to the second client, and the process repeats until the final client reveals a message designated for the aggregating server.

In either technique, clients may select intended recipients from the clients' address book or contacts list. The address book or contacts list may optionally be filtered to remove stale clients (e.g., those clients that have not been active in the communications network for at least a predetermined period of time). This may reduce the risk that the message will be forwarded to an offline client, which could cause the usage data to be lost or delayed.

In either technique, the final hop may be the aggregating server itself. To this end, the usage data may be encrypted with a client generated key that, when received by the server, can be used to decrypt the data. This allows the client to send the usage data in an encrypted form, so that the receiving clients in the chain cannot themselves decipher the usage data. The originating client may send the key to the server along a different path than the usage data. This variation has the advantage that the system can determine a loss rate for the usage data by identifying how much usage data is received without an accompanying key (and vice versa). Based on the usage data that is collected and the loss rate, the server may extrapolate a more accurate value for the usage data.

The two embodiments may also be combined. For instance, the usage data may be encrypted with an encryption key and wrapped in layers of encryption according to the second embodiment, while the encryption key is sent along a different path (potentially allowing each receiving client to select its own recipient so that the encryption key may travel further into the network from the originating user).

In either technique, the data and/or key may be padded in order to better disguise the usage data and/or key among the existing network traffic. Alternatively or in addition, the usage data and/or the encryption key may be split into multiple parts, and each part may be sent along a different path through the network.

When the data and/or key are split into multiple parts, an additional error correction part may optionally be added. For example, if the data is split into n parts, an $n+1^{th}$ part may be created, which represents an exclusive-or (XOR) operation performed on the n parts. Accordingly, even if one part is lost, the data/key can still be regenerated. If the n parts are received without the error correction code, the n parts can simply be combined as-is. If one of the n parts is lost but the error correction code is received, the server may regenerate the missing part based on the error correction code (e.g., by applying an inverse XOR operation with the n−1 parts and the error correction portion). This technique allows for a loss rate to be calculated, which may be used as described above in order to extrapolate more accurate usage data.

In either technique, a message authentication code such as a hash-based message authentication code (HMAC) may be used to verify that the usage data and/or encryption key have not been altered or corrupted in transit.

Next, exemplary data structures, data flows, and procedures for implementing the first embodiment and the second embodiment are described.

Figure 3F:
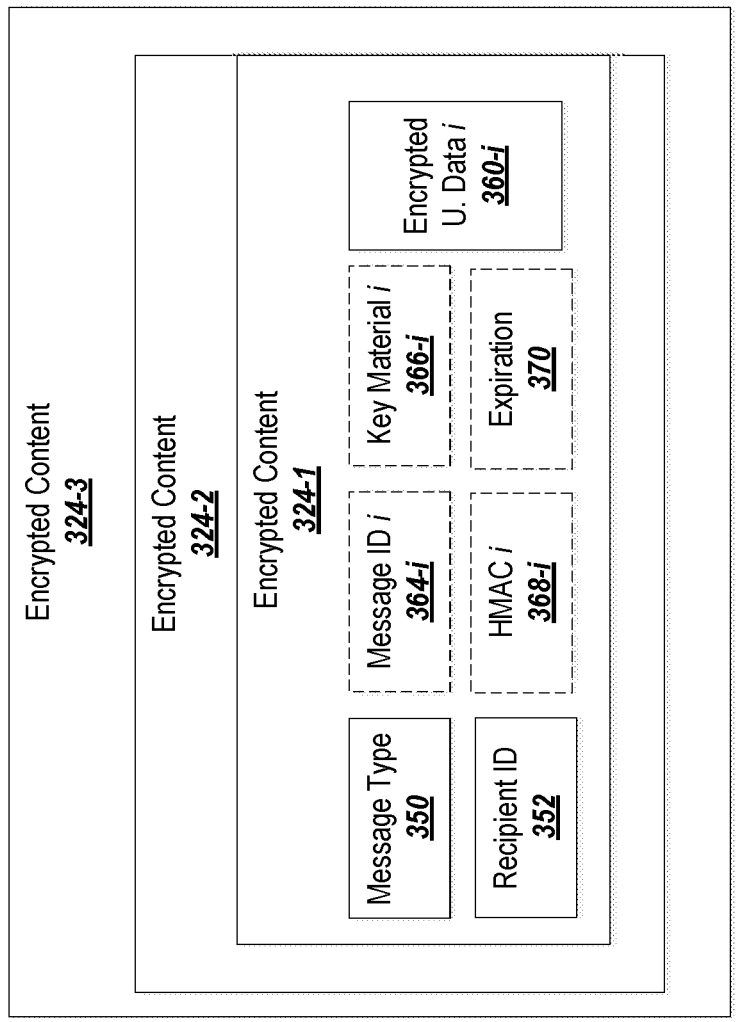
FIG. 3F depicts an exemplary data structure for anonymized information according to a second embodiment.
Figure 3E:
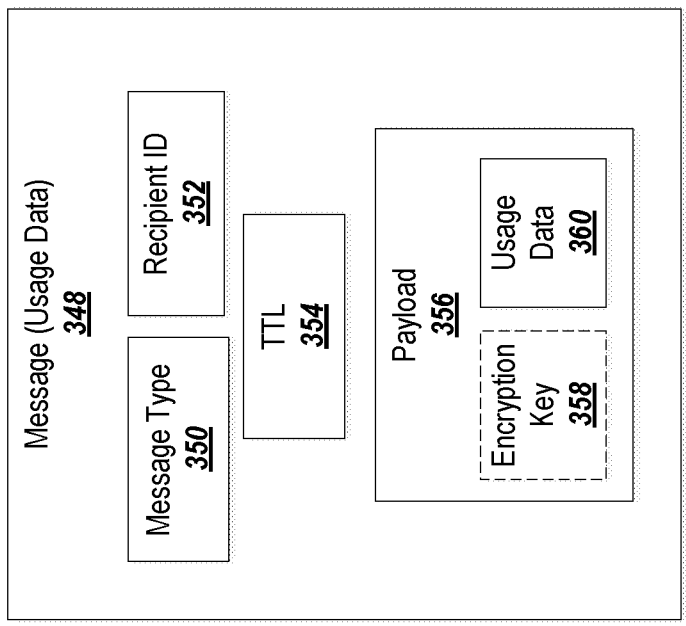
FIG. 3E depicts an exemplary data structure for anonymized information according to a first embodiment.

FIG. 3E depicts an exemplary data structure suitable for use with the first technique (in which messages are forwarded for a certain hopcount or time-to-live). The data structure is in the form of a message 348 exchanged between users in a network. The message 348 may be end-to-end encrypted (E2E), as described above, so that the contents of the message are not visible, except to the device that originates the message and the device that receives the message.

The message 348 may include a message type 350, which specifies what kind of message it is. For example, the message type 350 may indicate that the message contains encrypted usage data that is to be forwarded until a hopcount or time-to-live 354 expires. In one embodiment, the message type 350 identifies the message as a Relayed Log Message (RLM). The message type 350 may be provided in an E2E portion of the message so that outside devices, including a server relaying the message, cannot determine the message type.

The message 348 may include a recipient identifier 352, which may be included in an unencrypted portion of the message so that the message can be transmitted through the network to its proper destination.

The message 348 may include a payload 356, which may comprise the usage data 360. The usage data 360 may include information pertaining to the client's usage of the communications network, and may optionally also include an anonymized client identifier (e.g., an identifier that cannot be linked back to the originating client) so that the number of unique viewers or visitors to a network resource may be determined. In some embodiments, the originating client may encrypt the usage data 360 with an encryption key 358, in which case the encryption key 358 may also be included in the payload 356. If desired, the originating client may encrypt the usage data 360 with a server-specific key, so that the usage data 360 can only be decrypted by the server. For example, the originating client may choose a symmetric key, encrypt the usage data 360 with the symmetric key, and encrypt the symmetric key with the server's public key. Accordingly, only the server will be capable of decrypting the symmetric key (using the server's private key) which can be used to decrypt the usage data.

FIG. 3F depicts an exemplary data structure suitable for use with the second technique (in which messages are wrapped in multiple layers of encryption). In this embodiment, the originating client selects multiple recipient clients and an order in which the encrypted usage data should be sent to the recipient clients. The originating client selects the final recipient client and encrypts a message 324-1 specifically for that client. The originating client then selects the second-to-last recipient, and wraps the message 324-1 in another layer of encryption specific to the second-to-last recipient to generate a message 324-2 specifically for the second-to-last recipient. The process continues until all clients along the chain have been accounted for, with the first client in the chain having a final layer of encryption specific to that client as the outer layer of encryption, to generate a final message 324-3.

Note that some types of the information depicted in the innermost message 324-1 may be include in outer messages 324-2, 324-3. For example, each client will need to know the message type 350 and the next recipient 352 in the chain in order to properly handle the message. However, some types of information need not be repeated; for example, because the innermost message 324-1 is included as the payload of the next message 324-2, and because the second-to-last client need not access the encrypted usage data 360, the encrypted usage data 360 does not need to be repeated in the portion of the message 324-2 encrypted for the second-to-last client.

In this example, it is assumed that the usage data 360 is broken up into n parts that are distributed along different network paths. Accordingly, the example message 324-1 includes only a portion 360-$i$ of the usage data ($0 < i \leq n$).

The example depicted in FIG. 3F may also optionally make use of a message authentication code, such as a hash-based message authentication code (HMAC) to verify that the message has not been altered or corrupted in transit. To that end, the message 324-1 may include a message identifier 364-$i$, an HMAC code 368-$i$, key material 366-$i$, and an expiration value 370.

Optionally, the HMAC key used for the HMAC code 368 may be included explicitly as a second key in the message. However, an alternative is to generate the HMAC key using key material 366 that can be used to generate the symmetric key, the HMAC key 366, and the initialization vector (IV) for the symmetric encryption. In particular, the key material 366 may represent a suitable number of randomly generated bits. From this key material 366, an algorithm (such as HKDFv3) may be used to generate the IV, the symmetric key, and the HMAC key. The usage data 360 may be encrypted using the IV and the symmetric key, and the HMAC 368 may be computed on the encryption result using the HMAC key. This information (the key material 366, the computed HMAC 368, and the encrypted data 360) the may be split into n parts and incorporated into n messages to be distributed through different network paths. Each portion of the encrypted data 360 may be identified by a message ID 364 (e.g., "Part 1 of 10" or "Part Error_Correction of 10") that allows the server to regenerate the usage data from the various parts when they are received. Preferably, the message ID 364 may be at least 64 bits.

This alternative may be simpler or more efficient than including a dedicated HMAC key. Optionally, in order to protect against replay attacks, the message ID 364 may be included in the calculation of the HMAC 368. This assumes that the server will keep track of the identifiers of all recently processed messages, which may be useful in any event in order to prevent accidental duplication. The expiration 370 may represent an expiration time of the message 324-1, which may also be included in the calculation of the HMAC 368. This puts an upper bound on the amount of time the server needs to remember message IDs 364 for deduplication purposes.

The additional practices described in paragraphs 87-92 may be used in any combination with technique one or technique two. For example, the first technique may be used to send a message with a hop count, additionally adding an HMAC to ensure message integrity, using key material to generate both encryption key and HMAC key, and splitting the message and key material over multiple paths to be reassembled at the server.

This and other aspects of exemplary embodiments are next described in connection with the data flow diagram depicted in FIG. 4.

Exemplary Information Exchange

Figure 4:
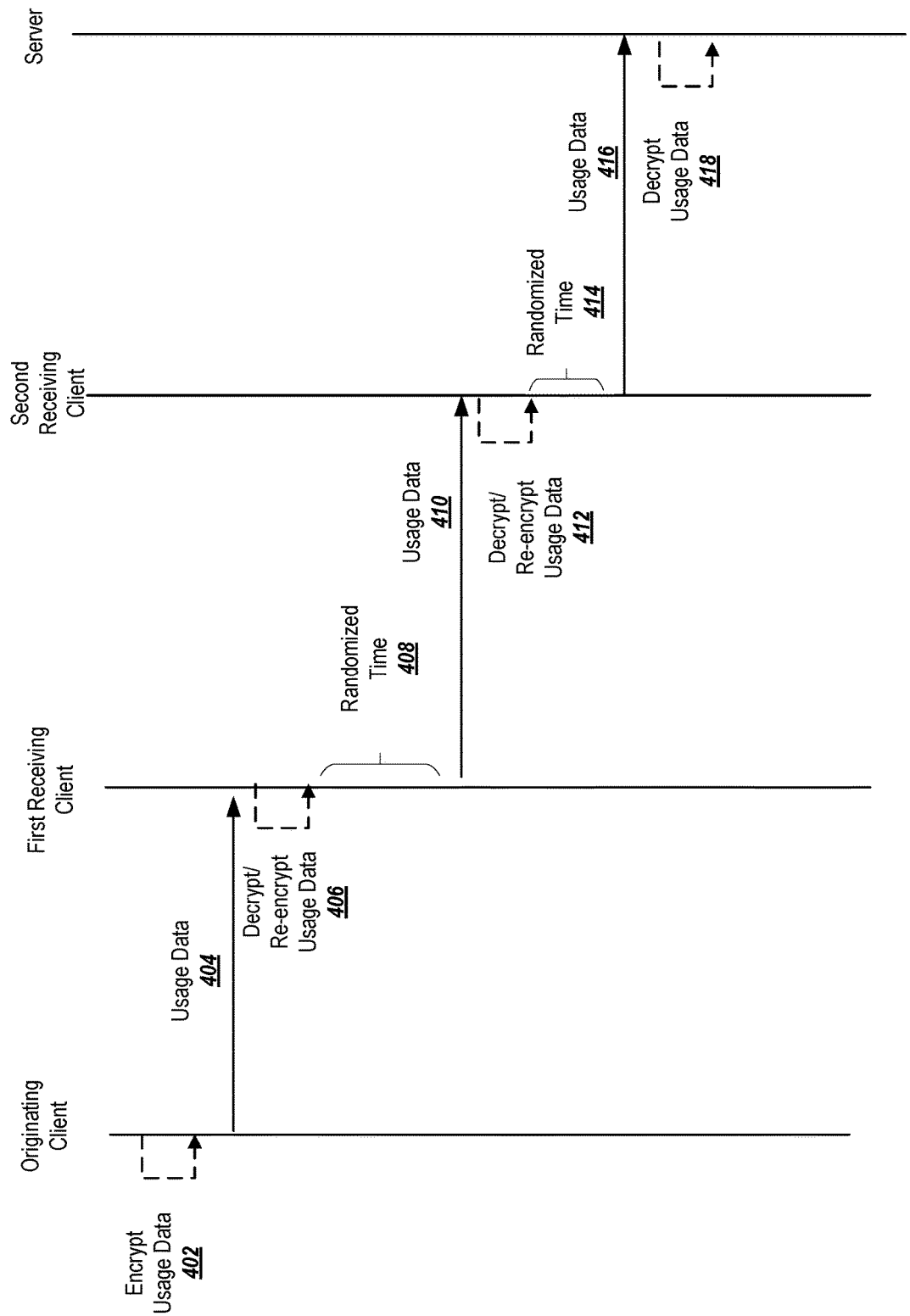
FIG. 4 is an exemplary data flow diagram showing information exchange in an end-to-end encrypted environment.

FIG. 4 is an exemplary data flow diagram showing information exchange in an end-to-end encrypted environment according to the first embodiment or the second embodiment. Initially, the originating client may perform a step 402 of encrypting its usage data (either with encryption specific to the destination server, or for the first receiving client, depending on the embodiment employed).

In the first embodiment, the originating client may identify the next hop along the chain to the destination server; in the second embodiment, the originating client may identify all hops and may wrap the usage data in layers of encryption as describe above.

The originating client then sends a message 404 with the encrypted usage data to the first client along the chain. The first receiving client may decrypt the message at step 406, and may optionally select a next client to receive the message and re-encrypt the message for that client (first embodiment). In the second embodiment, the first client simply removes its own layer of encryption to reveal a new encrypted message addressed to the second client.

In the first embodiment, the first client may decrement the hopcount or time-to-live of the message. Assuming that additional hops or TTL remain, the first client may then wait a randomized time 408 before retransmitting the usage data in a message 410 to the second receiving client.

This process may repeat with the second client decrypting and optionally re-encrypting the usage data at step 412, decrementing the hopcount or TTL, waiting a randomized time 414, and then retransmitting the usage data in a message 416. In this example, it is assumed that the second client is the final client in the chain (e.g., because the hopcount or TTL has expired, or because the originating client designated the second client as the final hop in the chain), and so the second receiving client forwards the usage data in a message 416 to the server that aggregates the usage data.

The server may decrypt the usage data in step 418 and use the anonymized usage data as necessary.

Exemplary Logic

Exemplary logic for implementing the above-described embodiments is next described in connection with FIGS. 5A-7C. The exemplary logic may be implemented in hardware, software, or a combination of hardware and software (e.g., being implemented at least partially in hardware).

FIG. 5A is a flowchart depicting exemplary logic 500 performed by a system, such as a sending client, for transmitting usage data according to the first embodiment described above.

At block 502, the client may generate or log usage data. The usage data may include any type of usage information such as a number of visits the user engaged in with a particular site or another user's profile, an amount of time spent viewing the site or profile, a geographic region of the user, what portion of the site or profile the user viewed (and/or how long the user spent there), what elements the user interacted with, etc.

At block 504, the client may optionally encrypt the usage data with a server key, as described above in connection with FIG. 3E.

At block 506, the client may select a time-to-live (TTL) or desired hopcount, which will define how long or how far the usage data will travel through the network. The TTL/hopcount may be decremented by each receiving client until the amount of time has expired or the number of hops has been met, at which point the client in possession of the usage data will transmit it to the server.

At block 508, the originating client may select the first receiving client to receive the data. The receiving client may be selected from the originating client's address book or contacts list, which may be filtered as described above to remove stale clients.

At block 510, the originating client may E2E encrypt a message including the usage data for the recipient selected at block 508. At block 512, the encrypted message may be transmitted to the selected recipient.

FIG. 5B is a flowchart depicting exemplary logic 550 performed by a system, such as a receiving client, for relaying the encrypted usage data according to the first embodiment.

At block 552, an E2E message including usage data may be received. The message may be decrypted at block 554 according to known E2E techniques.

At block 556, the client may verify the message type included in the message. For example, the message type may be a Relayed Log Message type, indicating that the message includes usage data to be relayed to another client or to the server. This may trigger further relay-type processing.

For instance, at block 558, the client may decrement the TTL or hopcount. If a hopcount is used, the client may decrement the hopcount by 1. If a TTL is used, the client may subtract an amount of time that has elapsed since the previous client processed the message (which may be indicated by a timestamp in the message). At block 560, the system may determine whether the TTL or hopcount has been decremented to (or beyond) 0, in which case the message should be forwarded to the server. In this case, at block 568 the client encrypts a message with server-specific encryption, and at block 570 the client transmits the message to the server.

If additional time or hops remain at block 560, then processing may proceed to block 562. At this block, the receiving client may select a next client to receive the message, then encrypt the message at block 564 and transmit the message at block 566. These actions are similar to the actions performed at blocks 508-512, except that the receiving client may wait a randomized amount of time before transmitting the message at block 566. This helps to prevent the server from determining which messages may be relayed usage statistics by observing the pattern of message transmissions in the network.

Figure 6A:
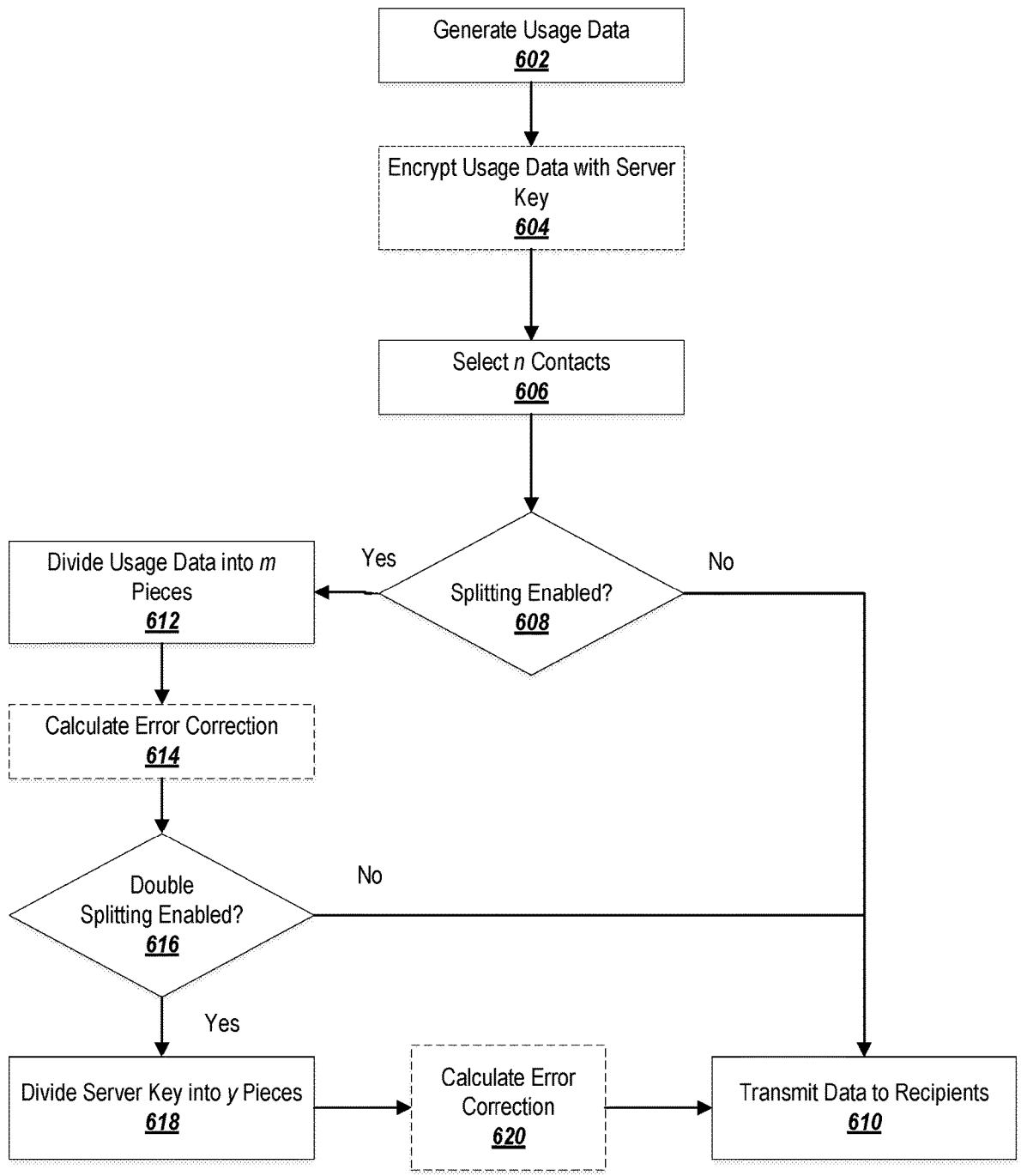
FIG. 6A is a flowchart depicting exemplary sending-client-side logic for transmitting anonymized information according to the second embodiment.

FIG. 6A is a flowchart depicting exemplary sending-client-side logic 600 for transmitting anonymized information according to the second embodiment. At block 602, the client generates usage data and optionally encrypts the usage data with a server key at block 604, similar to blocks 502 and 504 described above.

At block 606, the client may select n contacts from its contacts list or address book (potentially filtered, as discussed above) and may select an order in which the clients are to receive the messages.

At block 608, the client may determine if splitting of the usage data and/or encryption key is enabled. If not, then at block 610 the client may wrap the usage data in n layers of encryption (see FIG. 3F) and transmit the data to the first recipient in the chain.

If splitting is enabled at block 608, then at block 612 the system may divide the usage data into m pieces, where m may be determined by balancing the risk that the usage data will be identified in transit (under the assumption that breaking the usage data into more pieces will make it more difficult to intercept the usage data) against the risk that some of the messages will be lost (under the assumption that, the more messages transmitted, the greater the likelihood that some will be lost). Optionally, at block 614 an error correction portion for the m pieces may be generated, as described above.

At block 616, the client may determine if double splitting is enabled (i.e., if splitting of both the usage data and the encryption key is enabled). If so, then at block 618 the server key may be split into y pieces, and at block 620 an error correction may optionally be computed over the y pieces.

At block 610, the m pieces of usage data and the y pieces of the key may be transmitted. The usage data pieces and key pieces may be transmitted together (e.g., with one piece of usage data matched with one piece of key data, as shown in FIG. 4E) or separately (e.g., with each message containing either a usage data portion or an encryption key portion).

Without further measures, it is possible that the entirety of the m pieces of usage data will pass through the same downstream client, which may be undesirable. For instance, if m=2 (i.e., the message is split into two parts), and each part is sent to a different client on the first hop, it is possible that each receiving client will choose the same next hop as a destination, thereby sending both parts 1 and 2 of the message to the same client. This could theoretically allow this next receiving client to reconstruct the usage data. To avoid this situation, steps may be taken to ensure that different parts of the message cannot be sent to the same client. One possible way to implement this solution is to always (i.e., at each hop) send part 1 to an "odd" client (e.g., a client with an odd phone number, or for whom a hash of the client ID is odd, etc.). Part 2 may similarly be sent to an even client. This solution may be extended for any value of m by sending message part m to an odd or even client by taking the modulus of m. One of ordinary skill in the art will recognize that other techniques for avoiding sending all the message parts to a common client may also be implemented.

Figure 6B:
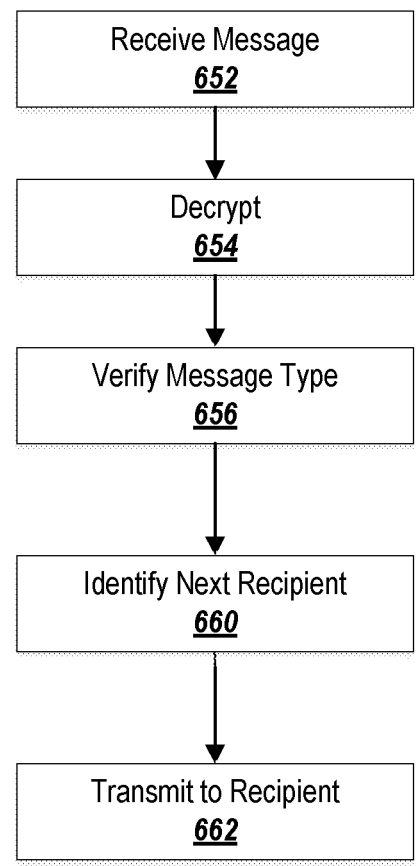
FIG. 6B is a flowchart depicting exemplary receiving-client-side logic for retransmitting anonymized information according to a first embodiment.

FIG. 6B is a flowchart depicting exemplary receiving-client-side logic 650 for retransmitting anonymized information according to the second embodiment.

Blocks 652, 654, and 656 generally proceed as described for blocks 552, 554, and 556 in FIG. 5B. At block 654, decrypting the message may reveal the next message layer, which may be encrypted for the next recipient (which may be designated in the now-decrypted message). This recipient may be identified at block 660, and the client may transmit the message to the next recipient at block 662. The next recipient may be the server.

In some cases, it may be necessary to perform additional setup work to transmit the message to the next recipient, because it was not the current receiving client that designated the next recipient, but rather the originating client. Accordingly, the originating client may have selected a next recipient that is not present in the current recipient's address book or contacts list. Therefore, the communications system may need to initiate an end-to-end encrypted session between the current receiving client and the next hop in the chain.

Figure 7A:
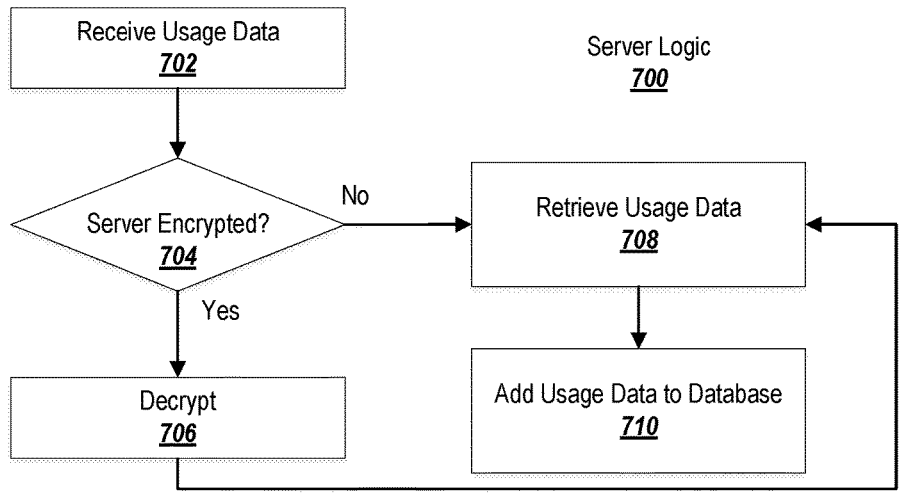
FIG. 7A is a flowchart depicting exemplary server-side logic for processing anonymized information according to the first embodiment.

FIG. 7A is a flowchart depicting exemplary server-side logic 700 for processing anonymized information according to the first embodiment.

At block 702, the server may receive usage data from a client. The client that forwarded the usage data to the server is likely not the same client that originated the data, and so the server may be unable to identify an originator of the usage data based on who sent the data to the server.

At block 704, the system may determine whether the usage data was sent in plaintext or whether the usage data was encrypted for the server. If the data was encrypted for the server, then at block 706 the server may decrypt the data using the server's private key, and processing may proceed to block 708. If the usage data was sent in plaintext, processing may proceed directly to block 708.

At block 708, the server may retrieve the usage data from the message, and at block 710 the server may add the usage data to a database. The usage data may be aggregated within and across clients in the database 710, potentially flagged with unique anonymized identifiers so that a number of unique viewers (or a similar statistic) may be calculated. Based on the information in the database 710, various usage statistics may be determined, which may be distributed to various users of the communications system (e.g., organizations interested in how many views their profiles are receiving, what users are doing on their site, how long users spend there, how often they return, etc.).

Figure 7B:
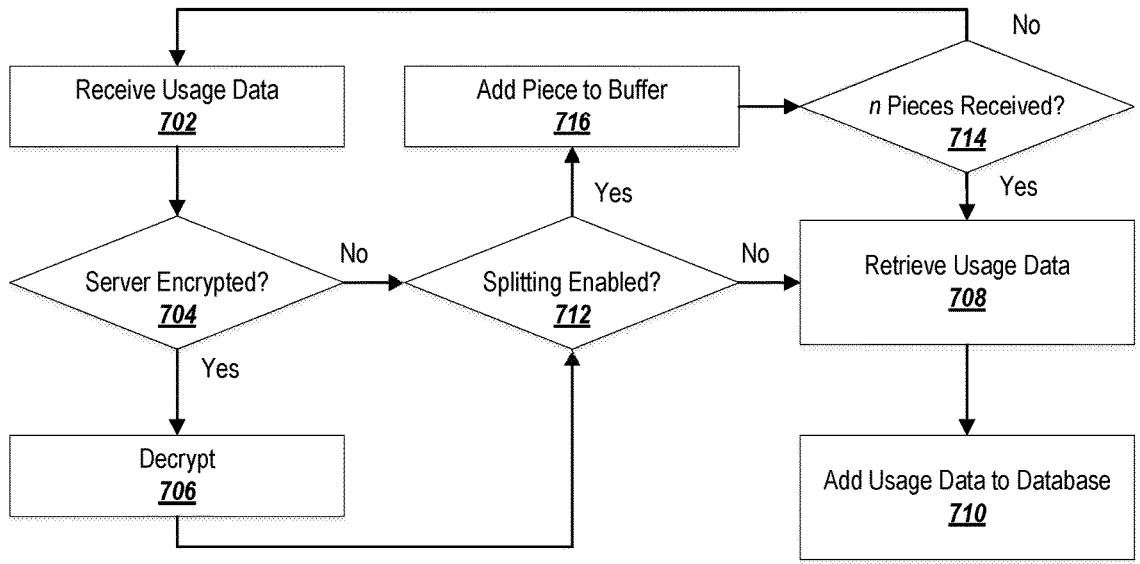
FIG. 7B is a flowchart depicting exemplary server-side logic for processing anonymized information according to the second embodiment.

FIG. 7B is a flowchart depicting exemplary server-side logic 750 for processing anonymized information according to the second embodiment. If splitting of the usage data and/or key is not enabled (which may be determined by examining the message to determine if the message includes an identifier (e.g., "Part 1 of 10"), then the logic 750 operates in much the same way as the logic 700 (in this case, like reference numbers describe like actions, and those descriptions are not repeated here for the sake of brevity). If splitting is enabled ("Yes" at block 712), the server may maintain a buffer that holds the pieces of usage data until they can be reassembled. As soon as n pieces have been received (which may be all of the usage data, or may be n−1 pieces of usage data and an error correction portion), the data in the buffer may be reassembled so that the usage data may be retrieved at block 708 and added to the database at block 710.

Communications System Overview

These examples may be implemented by a communications system that is provided locally, at a client device, or remotely (e.g., at a remote server), or some combination thereof. FIG. 8 depicts an example of a communications system, as discussed in more detail below.

FIG. 8A depicts an exemplary centralized communications system 800, which facilitates encrypted communication between two or more users. The centralized system 800 may implement some or all of the structure and/or operations of a messaging or communications service in a single computing entity, such as entirely within a single centralized server device 826.

The communications system 800 may include a computer-implemented system having software applications that include one or more components. Although the communications system 800 shown in FIG. 8A has a limited number of elements in a certain topology, the communications system 800 may include more or fewer elements in alternate topologies.

A communications service 800 may be generally arranged to receive, store, and deliver communications, such as messages. The communications may include or may be associated with media or content items.

A client device 810 may transmit communications addressed to one or more recipient users, user accounts, or other identifiers resolving to receiving client devices 810. In exemplary embodiments, each of the client devices 810 and their respective clients 820 are associated with a particular user or users of the communications service 800. In some embodiments, the client devices 810 may be cellular devices such as smartphones and may be identified to the communications service 800 based on a phone number associated with each of the client devices 810. In some embodiments, each client may be associated with a user account registered with the communications service 800. In general, each client may be addressed through various techniques for the reception of communications. While in some embodiments the client devices 810 may be cellular devices, in other embodiments one or more of the client devices 810 may be personal computers, tablet devices, any other form of computing device.

The client 810 may include one or more input devices 812 and one or more output devices 818. The input devices 812 may include, for example, microphones, keyboards, cameras, electronic pens, touch screens, and other devices for receiving inputs including message data, requests, commands, user interface interactions, selections, and other types of input. The output devices 818 may include a speaker, a display device such as a monitor or touch screen, and other devices for presenting an interface to the communications system 800.

The client 810 may include a memory, which may be a non-transitory computer readable storage medium, such as one or a combination of a hard drive, solid state drive, flash storage, read only memory, or random access memory. The memory may a representation of an input 814 and/or a representation of an output 816, as well as one or more applications. For example, the memory may store a messaging client 820 and/or a social networking client that allows a user to interact with a social networking service.

The input 814 may be textual, such as in the case where the input device 812 is a keyboard. Alternatively, the input

814 may be an audio or video recording, such as in the case where the input device 812 is a microphone or camera.

The input 814 may be subjected to automatic speech recognition (ASR) logic in order to transform the audio recording to text that is processable by the messaging system 800. The ASR logic may be located at the client device 810 (so that the audio recording is processed locally by the client 810 and corresponding text is transmitted to the communications server 826), or may be located remotely at the communications server 826 (in which case, the audio recording may be transmitted to the communications server 826 and the communications server 826 may process the audio into text). Other combinations are also possible—for example, if the input device 812 is a touch pad or electronic pen, the input 814 may be in the form of handwriting, which may be subjected to handwriting or optical character recognition analysis logic in order to transform the input 812 into processable text.

The client 810 may be provided with a network interface 822 for communicating with a network 824, such as the Internet. The network interface 822 may transmit the input 812 in a format and/or using a protocol compatible with the network 824 and may receive a corresponding output 816 from the network 824.

The network interface 822 may communicate through the network 824 to a communications server 826. The messaging server 826 may be operative to receive, store, and forward messages between messaging clients.

The communications server 826 may include a network interface 822, communications preferences 828, and communications logic 830. The communications preferences 828 may include one or more privacy settings for one or more users and/or video communications. For example, the communications preferences 828 may include one or more settings, including default settings, for the logic described herein.

The communications logic 830 may include ephemeral content logic 832 for generating, processing, and/or displaying ephemeral content messages, as described above (the ephemeral content logic 832 may also or alternatively be provided on the clients 810).

The network interface 822 of the client 810 and/or the communications server 826 may also be used to communicate through the network 824 with a social networking server 836. The social networking server 836 may include or may interact with a social networking graph 838 that defines connections in a social network. Furthermore, the communications server 826 may connect to the social networking server 836 for various purposes, such as retrieving connection information, messaging history, event details, etc. from the social network.

A user of the client 810 may be an individual (human user), an entity (e.g., an enterprise, business, or third-party application), or a group (e.g., of individuals or entities) that interacts or communicates with or over the social networking server 836. The social-networking server 836 may be a network-addressable computing system hosting an online social network. The social networking server 836 may generate, store, receive, and send social-networking data, such as, for example, user-profile data, concept-profile data, social-graph information, or other suitable data related to the online social network. The social networking server 836 may be accessed by the other components of the network environment either directly or via the network 824.

The social networking server 836 may include an authorization server (or other suitable component(s)) that allows users to opt in to or opt out of having their actions logged by social-networking server 836 or shared with other systems (e.g., third-party systems, such as the messaging server 826), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 836 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 838. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 836 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 836 may send a request to the data store for the object. The request may identify the user associated with the request. The requested data object may only be sent to the user (or a client system 810 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 836 or explicit connections of a user to a node, object, entity, brand, or page on social networking server 836. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The embodiments described above may be performed by a messaging architecture, an example of which is next described with reference to FIG. 9.

Messaging Architecture

Figure 9:
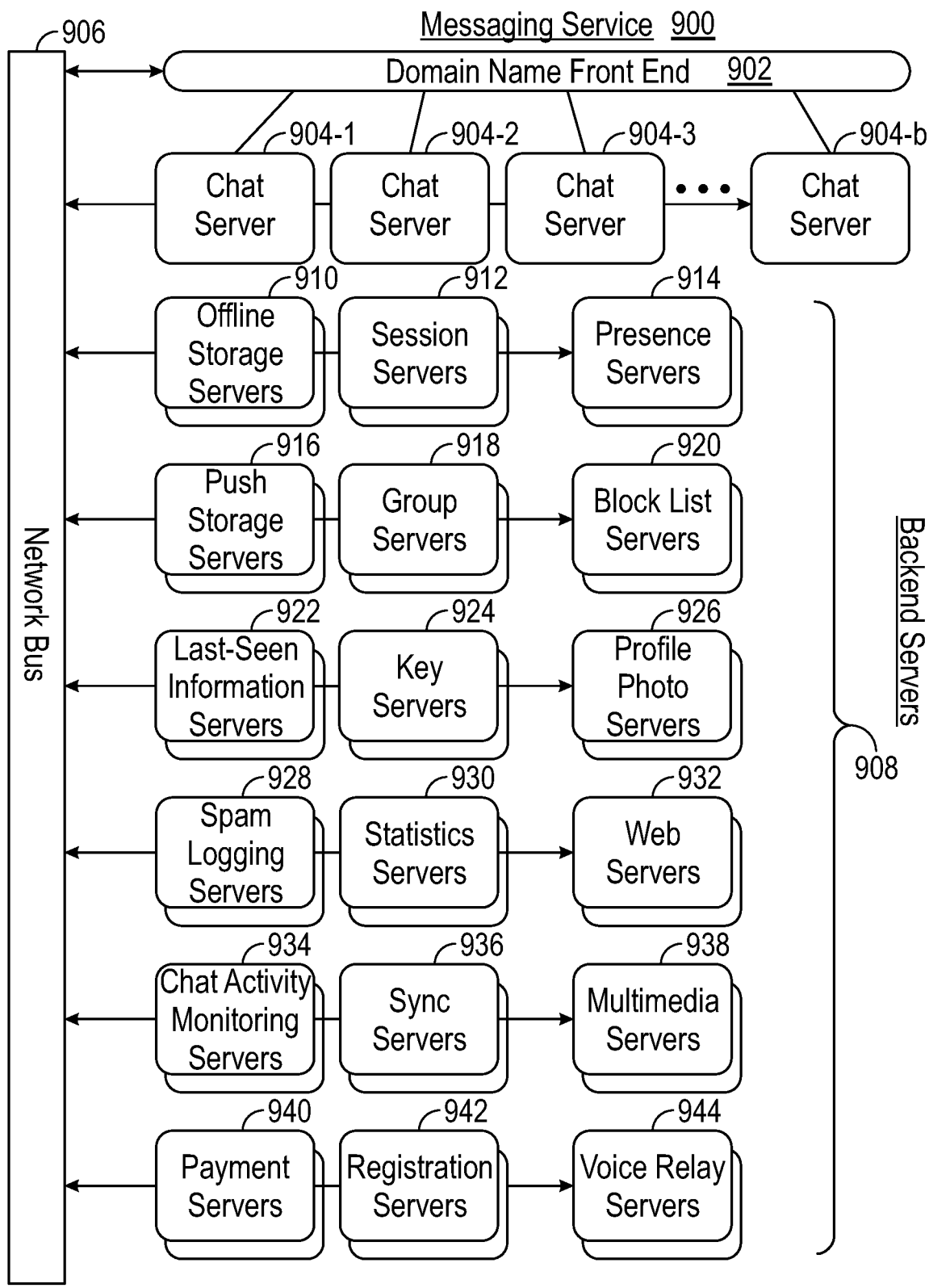
FIG. 9 is a block diagram depicting an example of a system for a messaging service.

FIG. 9 illustrates an embodiment of a plurality of servers implementing various functions of a messaging service 900 suitable for use with exemplary embodiments. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Figure 10:
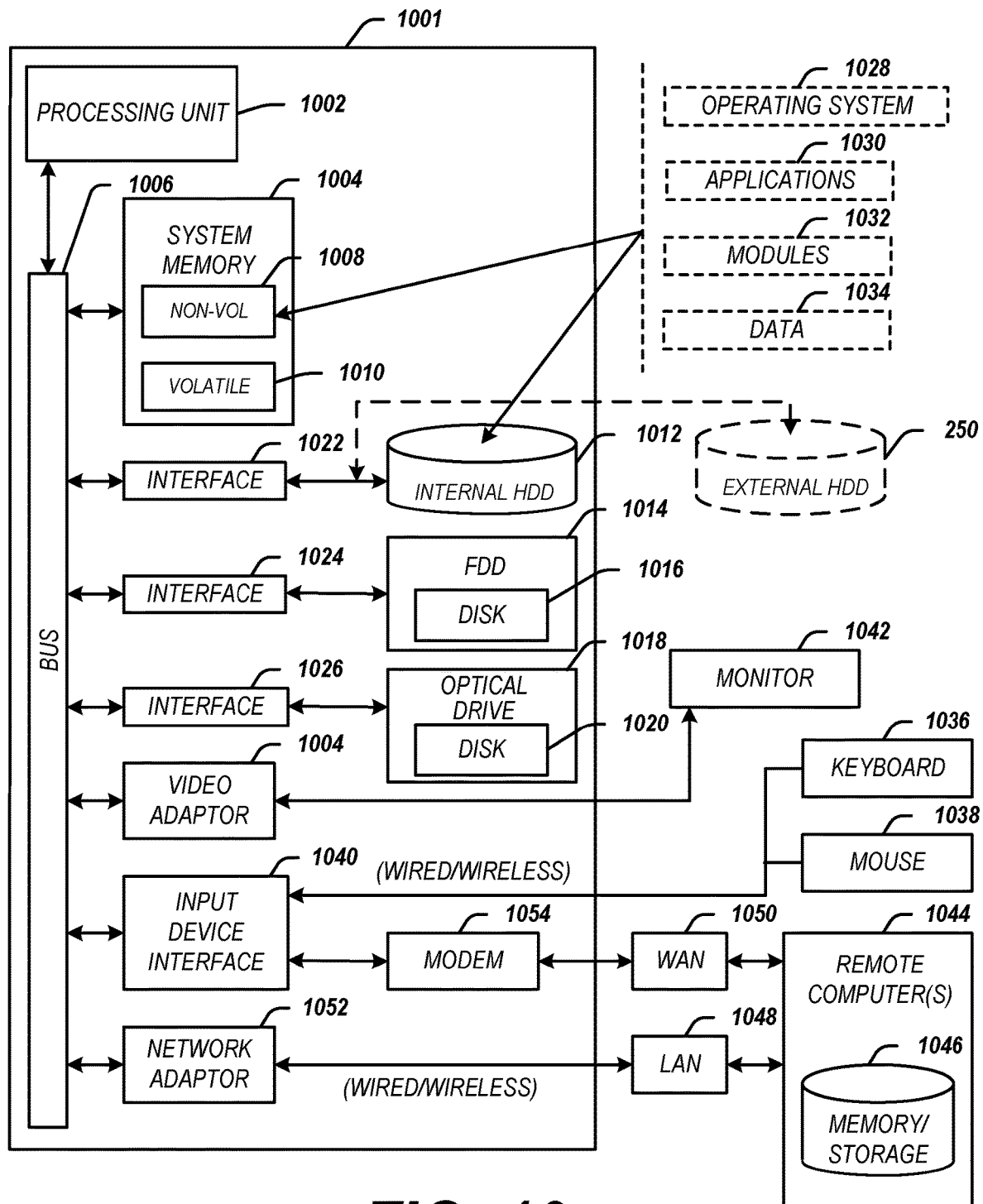
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures.

Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
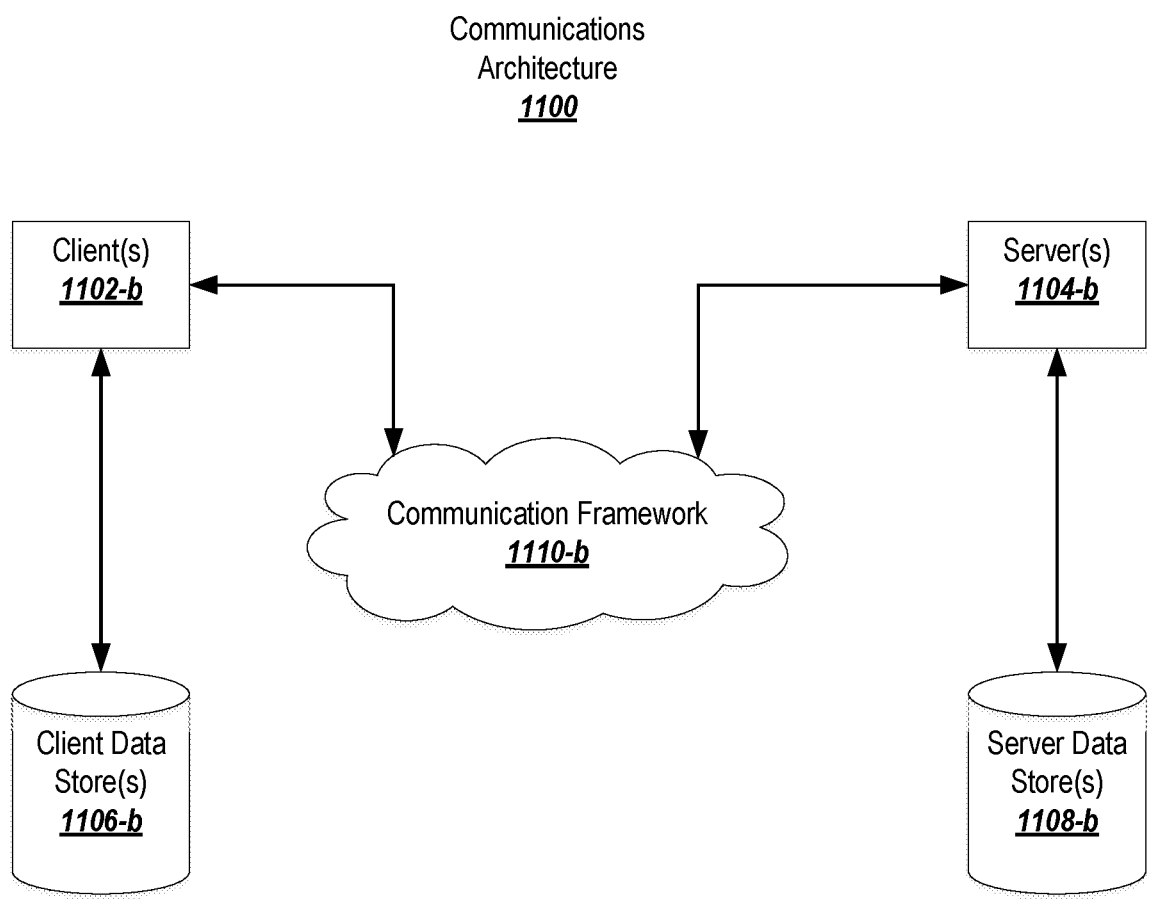
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
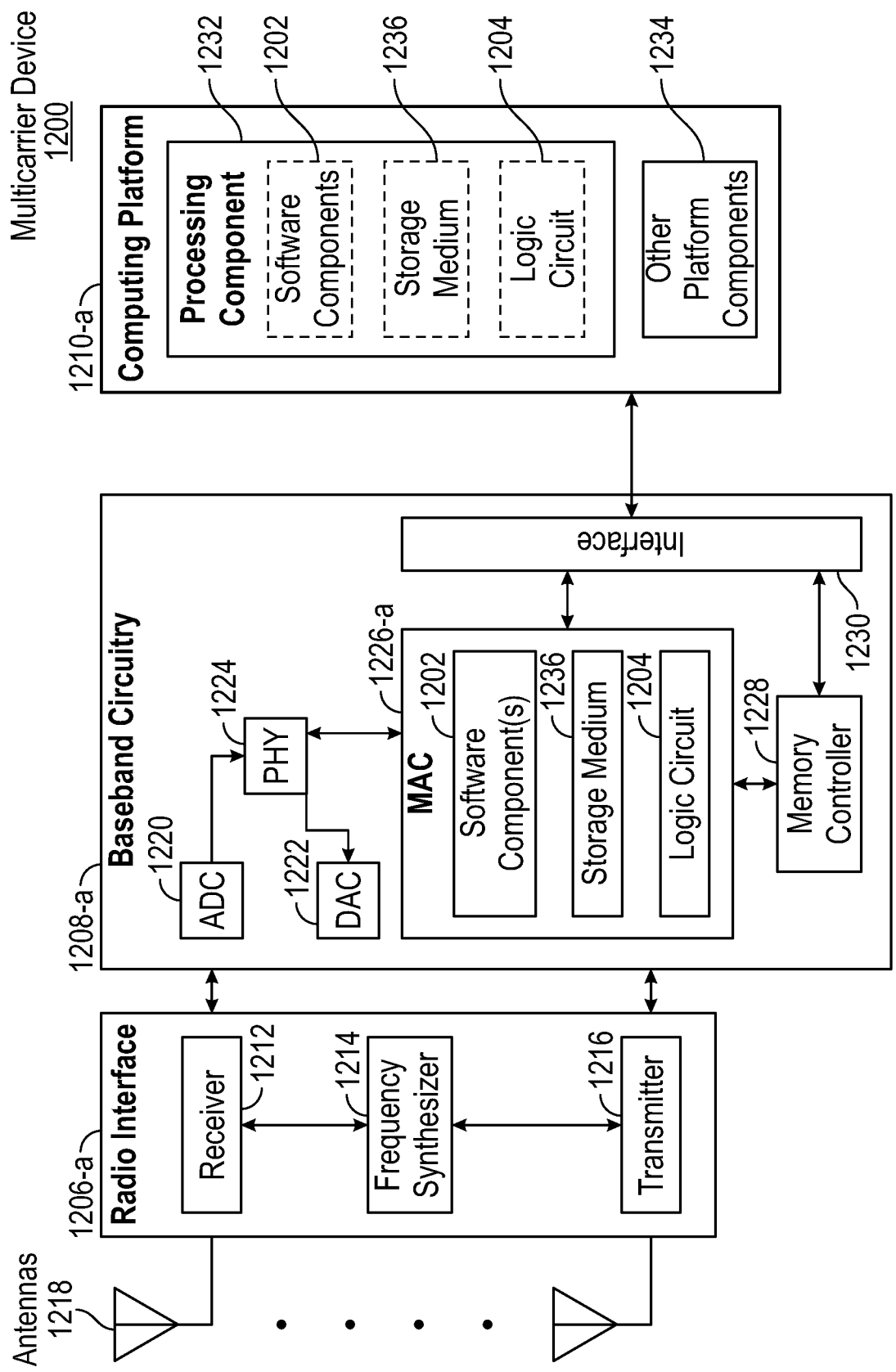
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
    dividing use data for an end-to-end encrypted (E2EE) messaging system into a plurality of parts based on a plurality of contacts in a contacts list in the E2EE messaging system;
    encrypting each respective part of the plurality of parts in a respective layer of encryption, of a plurality of layers of encryption, each layer of encryption associated with a respective contact of the plurality of contacts;
    determining a number of hops, the number of hops defining a length of a chain along which the plurality of parts is to be sent, at least one part of the plurality of parts configured to be decrypted and re-encrypted at each hop in the chain, wherein a count of the Plurality of parts equals the number of hops, wherein a count of the plurality of contacts equals the number of hogs; and
    forwarding a message comprising the encrypted plurality of parts and the number of hops to a first contact of the plurality of contacts.

2. The method of claim 1, wherein the use data comprises information describing a client interaction with a message in the E2EE messaging system.

3. The method of claim 1, further comprising computing a hashed message authentication code (HMAC) on at least part of the use data and adding the HMAC to the message.

4. The method of claim 1, the method further comprising:
    dividing an encryption key into a plurality of encryption key parts, wherein a count of the plurality of encryption key parts equals the number of hops, wherein the forwarded message includes the plurality of encryption key parts.

5. The method of claim 4, further comprising:
    generating a message containing error correction data for the plurality of parts and the plurality of encryption key parts; and
    forwarding a message containing the error correction data to the first contact.

6. The method of claim 1, further comprising padding the divided use data with padding data prior to the encryption.

7. The method of claim 1, wherein at least one layer of the plurality of layers of encryption is encoded using a server key associated with the server.

8. A non-transitory computer-readable storage medium, the computer-readable storage medium including instructions that when executed by a processor, cause the processor to:

divide use data for an end-to-end encrypted (E2EE) messaging system into a plurality of parts based on a plurality of contacts in a contacts list in the E2EE messaging system;

encrypt each respective part of the plurality of parts in a respective layer of encryption, of a plurality of layers of encryption, each layer of encryption associated with a respective contact of the plurality of contacts;

determine a number of hops, the number of hops defining a length of a chain along which the plurality of parts is to be sent, at least one part of the plurality of parts configured to be decrypted and re-encrypted at each hop in the chain, wherein a count of the Plurality of parts equals the number of hops, wherein a count of the plurality of contacts equals the number of hogs; and forward a message comprising the encrypted plurality of parts and the number of hops to a first contact of the plurality of contacts.

9. The computer-readable storage medium of claim 8, wherein the use data comprises information describing a client interaction with a message in the E2EE messaging system.

10. The computer-readable storage medium of claim 8, wherein the instructions further cause the processor to compute a hashed message authentication code (HMAC) on at least part of the use data and add the HMAC to the message.

11. The computer-readable storage medium of claim 8, wherein the instructions further cause the processor to:
divide an encryption key into a plurality of encryption key parts, wherein a count of the plurality of encryption key parts equals the number of hops, wherein the forwarded message includes the plurality of encryption key parts.

12. The computer-readable storage medium of claim 11, wherein the instructions further cause the processor to:
generate a message containing error correction data for the plurality of parts and the plurality of encryption key parts; and
forward a message containing the error correction data to the first contact.

13. The computer-readable storage medium of claim 8, wherein the instructions further cause the processor to pad the divided use data with padding data prior to the encryption.

14. The computer-readable storage medium of claim 8, wherein at least one layer of the plurality of layers of encryption is encoded use a server key associated with the server.

15. A computing apparatus comprising:
a processor; and
a memory storing instructions that, when executed by the processor, cause the processor to:
divide use data for an end-to-end encrypted (E2EE) messaging system into a plurality of parts based on a plurality of contacts in a contacts list in the E2EE messaging system;
encrypt each respective part of the plurality of parts in a respective layer of encryption, of a plurality of layers of encryption, each layer of encryption associated with a respective contact of the plurality of contacts;
determine a number of hops, the number of hops defining a length of a chain along which the plurality of parts is to be sent, at least one part of the plurality of parts configured to be decrypted and re-encrypted at each hop in the chain, wherein a count of the plurality of parts equals the number of hops, wherein a count of the plurality of contacts equals the number of hops; and
forward a message comprising the encrypted plurality of parts and the number of hops to a first contact of the plurality of contacts.

16. The computing apparatus of claim 15, wherein the use data comprises information describing a client interaction with a message in the E2EE messaging system.

17. The computing apparatus of claim 15, wherein the instructions further cause the processor to compute a hashed message authentication code (HMAC) on at least part of the use data and add the HMAC to the message.

18. The computing apparatus of claim 15, wherein the instructions further cause the processor to:
divide an encryption key into a plurality of encryption key parts, wherein a count of the plurality of encryption key parts equals the number of hops, wherein the forwarded message includes the plurality of encryption key parts.

19. The computing apparatus of claim 18, wherein the instructions further cause the processor to:
generate a message containing error correction data for the plurality of parts and the plurality of encryption key parts; and
forward a message containing the error correction data to the first contact.

20. The computing apparatus of claim 15, wherein the instructions further cause the processor to pad the divided use data with padding data prior to the encryption.

* * * * *